US009201482B2

(12) United States Patent
Lin (10) Patent No.: US 9,201,482 B2
(45) Date of Patent: Dec. 1, 2015

(54) MODULAR STRUCTURE OF INDEPENDENT OUTPUT/INPUT SOCKET FOR UPS

(71) Applicant: Ruei Feng Lin, Taichung (TW)

(72) Inventor: Ruei Feng Lin, Taichung (TW)

( * ) Notice: Subject to any disclaimer, the term of this patent is extended or adjusted under 35 U.S.C. 154(b) by 673 days.

(21) Appl. No.: 13/645,521

(22) Filed: Oct. 5, 2012

(65) Prior Publication Data

US 2014/0099834 A1    Apr. 10, 2014

(51) Int. Cl.
| | |
|---|---|
| *G06F 1/30* | (2006.01) |
| *H01R 13/514* | (2006.01) |
| *H01R 31/06* | (2006.01) |
| *H01R 13/70* | (2006.01) |
| *H01R 25/00* | (2006.01) |

(52) U.S. Cl.
CPC *G06F 1/305* (2013.01); *G06F 1/30* (2013.01); *H01R 13/514* (2013.01); *H01R 31/065* (2013.01); *H01R 13/70* (2013.01); *H01R 25/006* (2013.01)

(58) Field of Classification Search
CPC ... G06F 1/263; G06F 1/30–1/305; H02J 9/00; H02J 9/061; H01R 13/514
See application file for complete search history.

(56) References Cited

U.S. PATENT DOCUMENTS

| | | | | |
|---|---|---|---|---|
| 5,633,572 | A * | 5/1997 | Steele et al. | 361/728 |
| 5,793,627 | A * | 8/1998 | Caldes et al. | 363/146 |
| 6,486,789 | B2 * | 11/2002 | Germagian et al. | 340/693.5 |
| 6,894,622 | B2 * | 5/2005 | Germagian et al. | 340/693.5 |
| 6,923,676 | B2 * | 8/2005 | Perry | 439/500 |
| 7,158,382 | B2 * | 1/2007 | Fan et al. | 361/715 |
| 7,385,805 | B2 * | 6/2008 | Germagian et al. | 361/644 |
| 7,402,062 | B2 * | 7/2008 | Perry | 439/248 |
| 8,283,802 | B2 * | 10/2012 | Jansma et al. | 307/23 |
| 2001/0027066 | A1 * | 10/2001 | Loh | 439/701 |
| 2003/0133263 | A1 * | 7/2003 | Shu | 361/685 |
| 2007/0115616 | A1 * | 5/2007 | Vackar | 361/601 |

FOREIGN PATENT DOCUMENTS

EP        0574628 A1 *  12/1993    ............ H02J 9/06

* cited by examiner

*Primary Examiner* — Robert J Hoffberg
(74) *Attorney, Agent, or Firm* — Raymond Y. Chan; David and Raymond Patent Firm (57) ABSTRACT

In a modular structure of independent output/input socket for UPS, when UPS needs to be repaired, the bypass switch of the detachable socket is turned on, so that the input power is directly connected with power output sockets through the power input wire. The detachable socket is then removed from the UPS host, and the UPS host is sent to be repaired. Load equipment plugs do not need to be unplugged from the power output jacks one by one, and moved to the power socket on the wall. If there are not enough power sockets on the wall, then additional extension wire sockets having multi-jacks need to be utilized for electrical connection. The action of unplugging and plugging in load plugs into the different power sources can be tedious and even dangerous. The detachable output/input sockets are also replaceable with different plug adapters for use with the different power plug standards around the world.

7 Claims, 11 Drawing Sheets

MODULAR STRUCTURE OF INDEPENDENT OUTPUT/INPUT SOCKET FOR UPS

BACKGROUND OF THE PRESENT INVENTION

1. Field of Invention

The present invention relates to a modular structure that contains independent output/input sockets for a UPS, and more particular to a modular structure of independent output/input sockets which are detachable to make repair of the UPS more convenient. The detachable output/input sockets are capable of being replaceable with different plug adapters for use with the different power plug standards around the world.

2. Description of Related Arts

With the ever increasing complexities of electrical facilities, due to constant advancements in science and technology, the need for the electrical safety of the load constantly increases. Similarly, the functional requirement for an uninterruptible power supply or UPS also constantly increases.

An Uninterruptible Power Supply is a device that provides emergency power to a load when an input power source fails. In a conventional UPS, the entire power output/input sockets are fixed on the UPS host, and load plugs are plugged into the power output sockets. When the UPS host needs to be repaired, each of these load plugs must be removed from the power output sockets and be re-plugged into a different power source such as a wall socket. If the different power source is not able to accommodate the number of load plugs then some type of multi jack extension must be used. The action of unplugging and plugging in load plugs into the different power sources can be tedious and even dangerous. It should be noted that on conventional UPS the power output sockets are restricted to a single type. The UPS host is unable to change sockets to meet the different power plug requirements of the different countries around the world. These detachable sockets lack safety, advancement, and practicability.

These disadvantages have lead the inventor to modify and improve the existing conventional UPS. This invention retains the original functionality of a conventional UPS, and through the inventors many years of professional experience have lead to the present invention. The invention entails a modular structure of independent output/input sockets for a UPS, where the output/input sockets are capable of detaching and being replaced with adaptors to meet various power plug types from around the world as the user requires.

SUMMARY OF THE PRESENT INVENTION

Therefore, in order to solve the problem associated with conventional UPS, the inventor has carefully developed a modular structure of independent output/input sockets for UPS.

The invention is advantageous in that when the UPS needs to be repaired, the bypass switch of the detachable socket is turned on, so that the input power is directly connected with power output sockets through the power input wire. The detachable socket is then removed from the UPS host, and the UPS host is sent to be repaired. In other words, the original equipment plugs that are plugged into the sockets do not need to be unplugged and moved to a power sockets on the wall. If there are not enough power sockets on the wall, then additional extension wire having multi jacks sockets need to be utilized for electrical connection. The action of unplugging and plugging in load plugs into the different power sources can be tedious and even dangerous.

Another advantage of the invention is that the detachable output/input sockets are also replaceable with different plug adapters for use with the different power plug standards around the world. After the socket supporter is fastened on the UPS host, the detachable socket is inserted into the socket supporter. This socket supporter is capable of replacing the detachable socket and being replaced with an adaptor for different power output jacks from around the world. The detachable socket is intended to be safe, advanced and practical.

To achieve the above objectives, the present invention provides a modular structure of independent output/input sockets for UPS through the following technical means. The modular structure of independent output/input socket for UPS comprises: a UPS host, a socket supporter, and a detachable socket. The foreside of the UPS host body has a fastening hole and a receiving cavity, wherein the edge of the receiving cavity has a plurality of tightening holes. The receiving cavity is arranged for a storage battery, a transformer, and a circuit board. The socket supporter, the detachable socket, the storage battery, the transformer, and the circuit are all connected with connection wire.

A socket supporter is fastened to the top portion of the host body. The socket supporter has a UPS switch on the fore portion, a barb which is capable of coupling with the fastening hole on the bottom portion, and an insertion space at rear portion. The insertion space has a host power joint on the fore portion, a restraining pole at the rear portion, and a plurality of securing holes at the edge thereof.

A detachable socket is inserted into the insertion space. The upper portion of the detachable socket has a plurality of power output jacks. The rear portion of power output jacks have a bypass switch and a power input wire. The bypass switch has a protection cover which is capable of being open. The bottom side of the detachable socket has a socket bottom board. The foreside of the socket bottom board has a perforation, and the rear side of the socket bottom board socket has restraining hole. The perforation has a socket power joint. After the host power joint is inserted in the socket power joint, the restraining hole is coupled with the restraining pole.

DETAILED DESCRIPTION OF THE PREFERRED EMBODIMENT

The present invention is a modular structure of independent output/input socket for UPS. Referring to drawing of the preferred embodiment of the present invention, the specific embodiment and components are illustrated. The descriptions of front and rear, left and right, top and bottom, upper and lower, and vertical and horizontal are not meant to limit the preferred embodiment of the present invention or any of the aforementioned components. The reference of size in Drawings and Specification can be changed according to design and requirement of specific embodiment of the present invention in the scope of the present invention.

Figure 1:
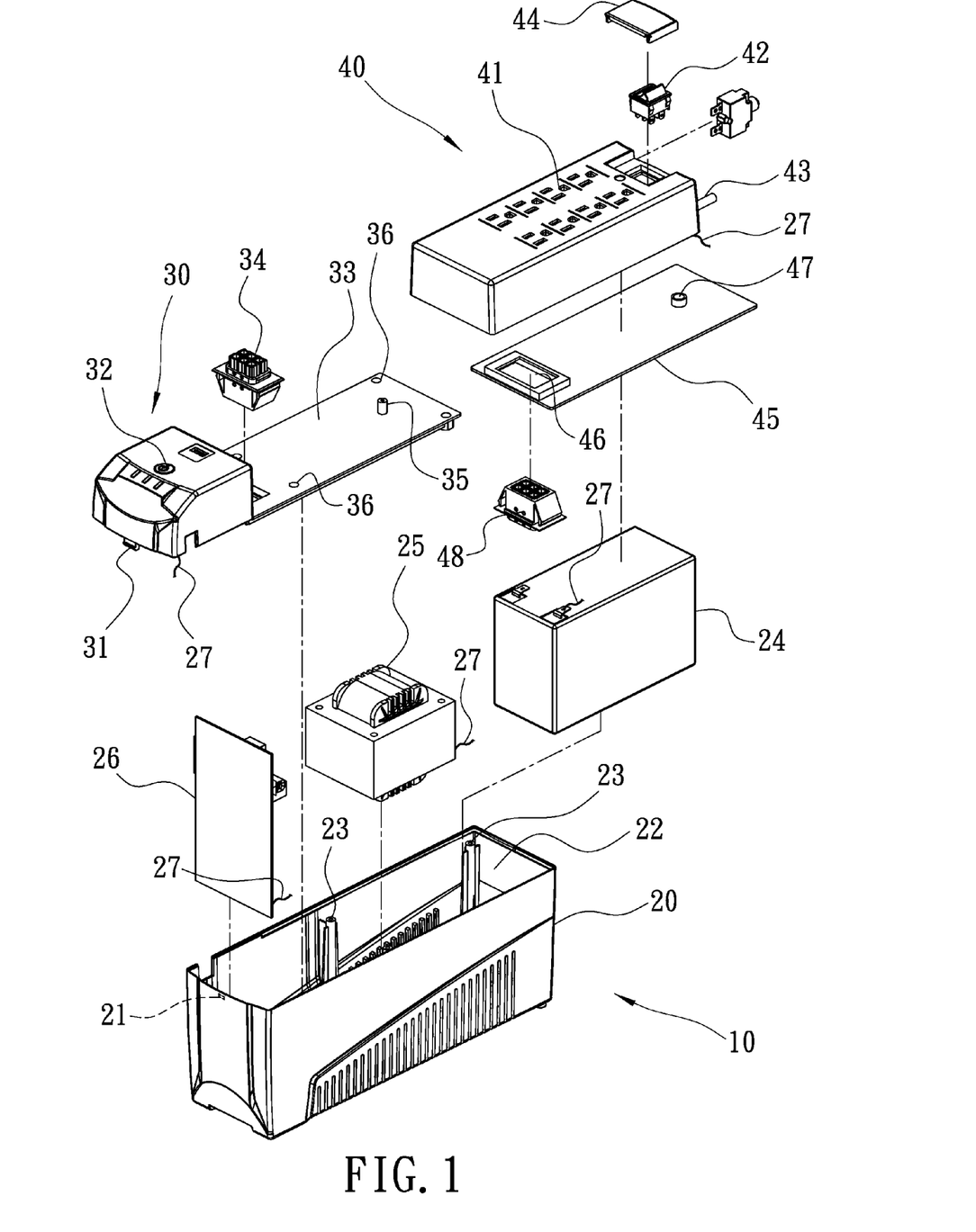
FIG. 1 is an exploded view of a modular structure of independent output/input socket for UPS according to a preferred embodiment of the present invention.
Figure 2:
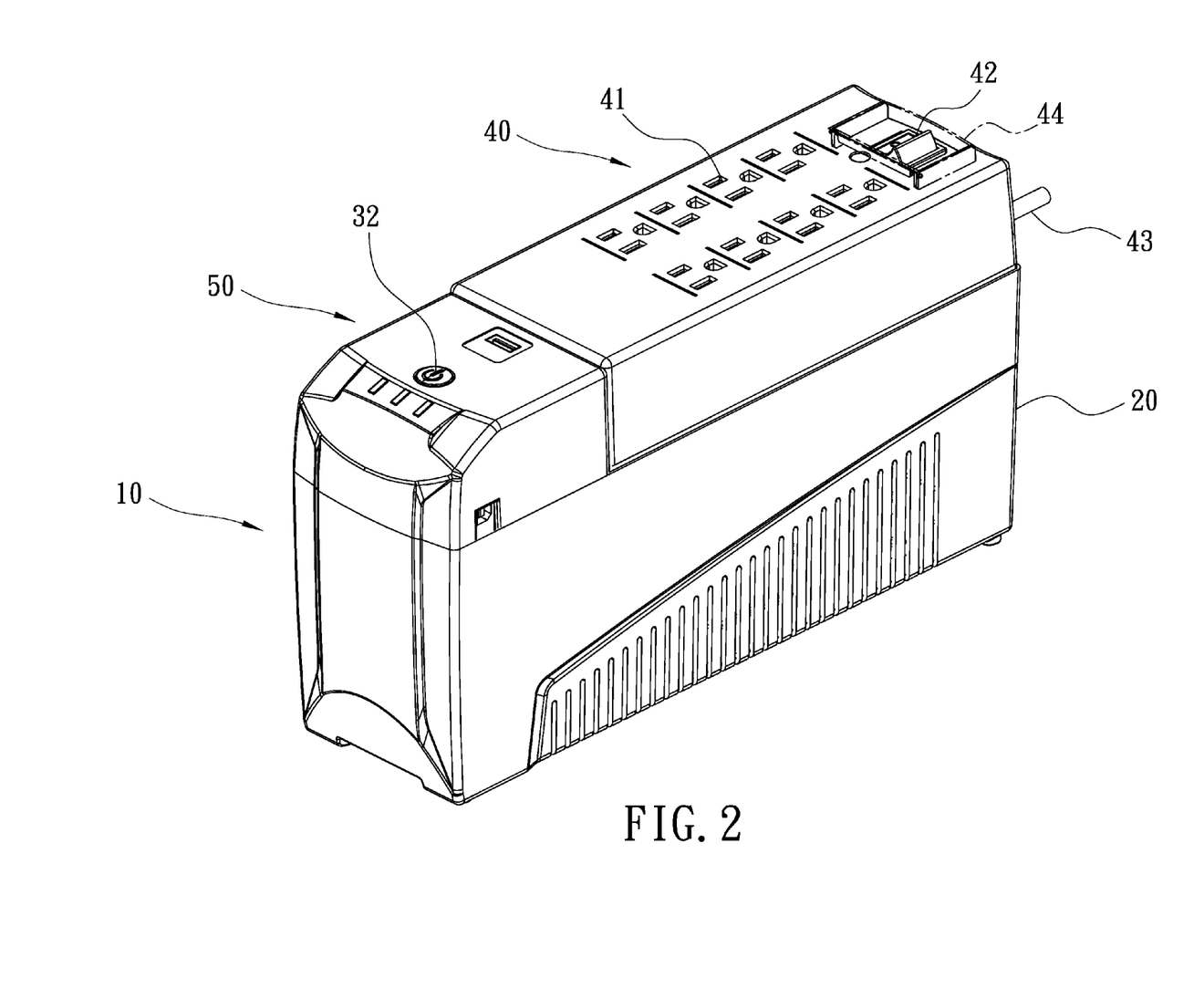
FIG. 2 is a perspective view of a modular structure of independent output/input socket for UPS according to above preferred embodiment of the present invention.
Figure 3:
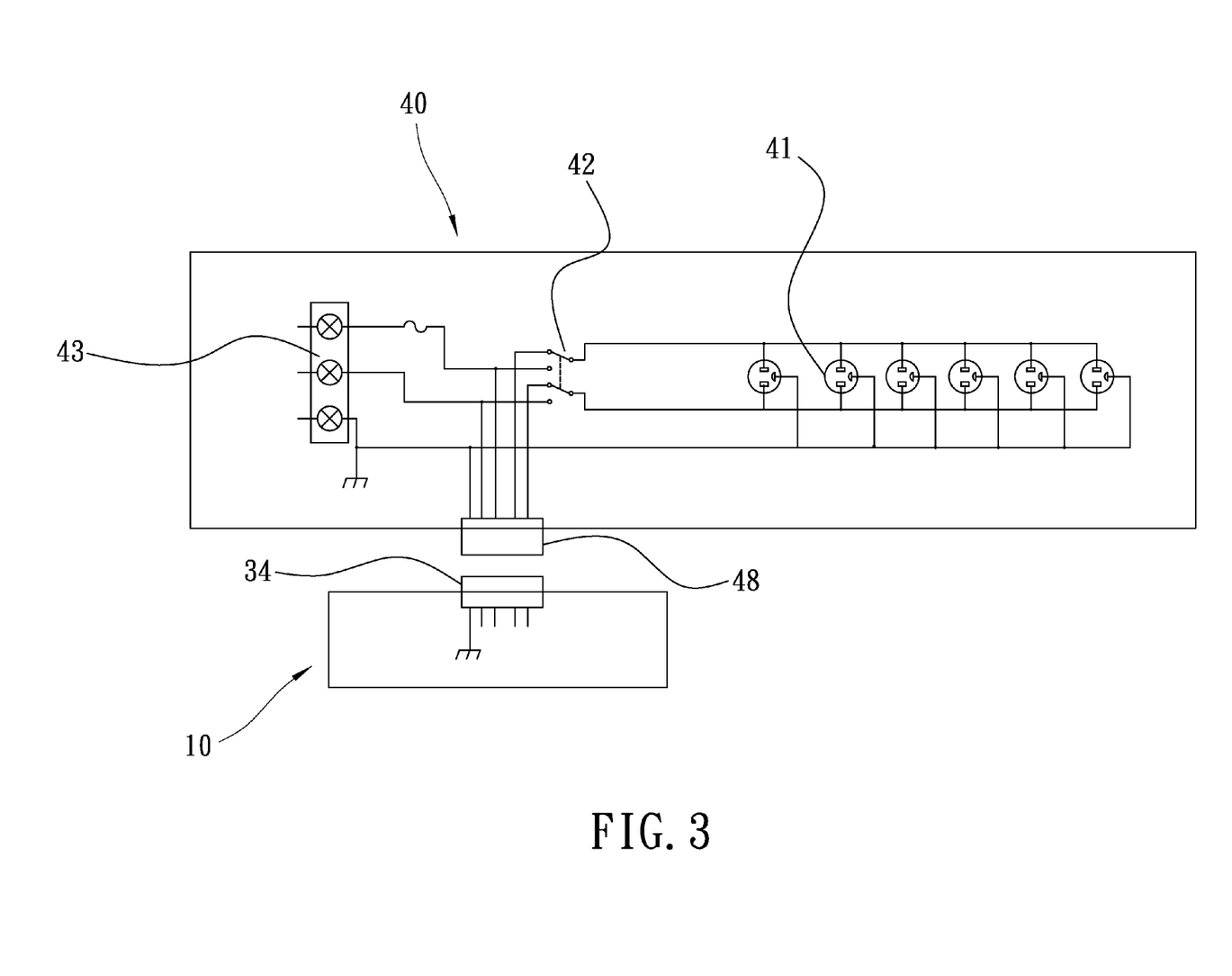
FIG. 3 is a circuit diagram of a modular structure of independent output/input socket for UPS according to above preferred embodiment of the present invention.
Figure 4:
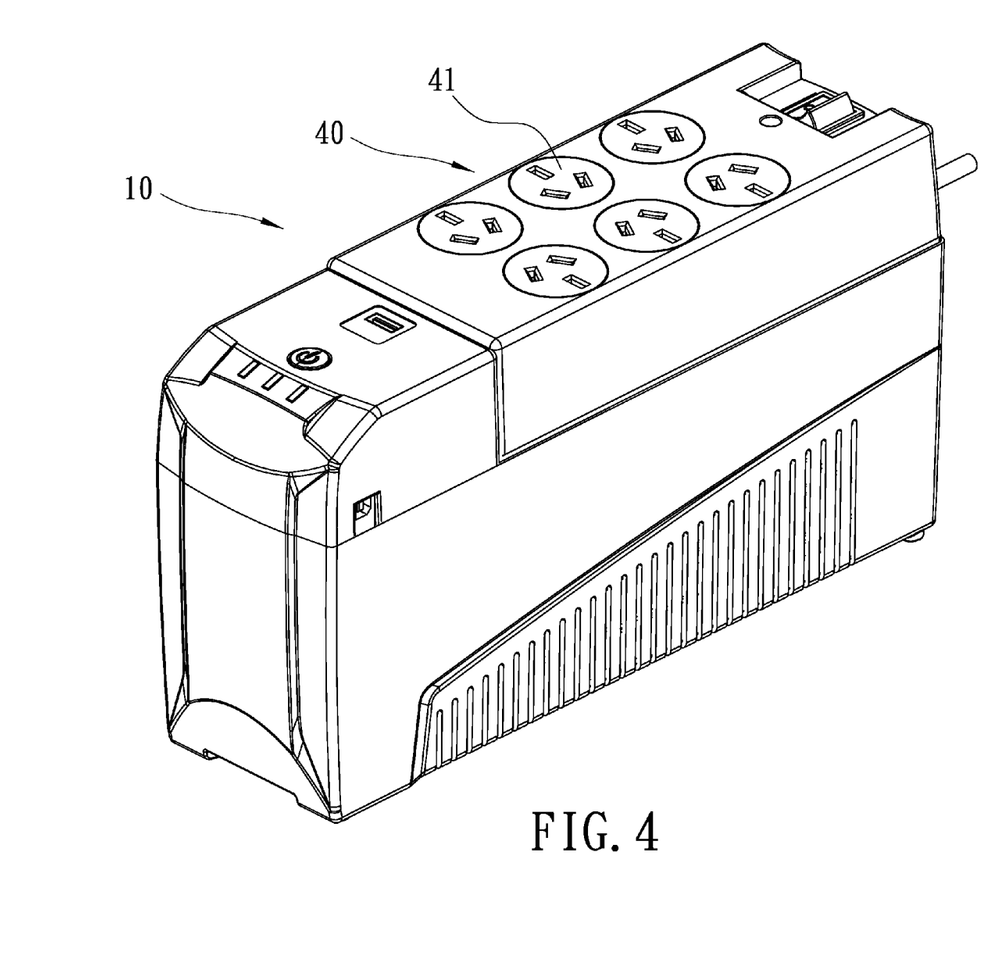
FIG. 4 is a perspective view of a modular structure of independent output/input socket for UPS according to an alternative mode of the above preferred embodiment of the present invention.
Figure 5:
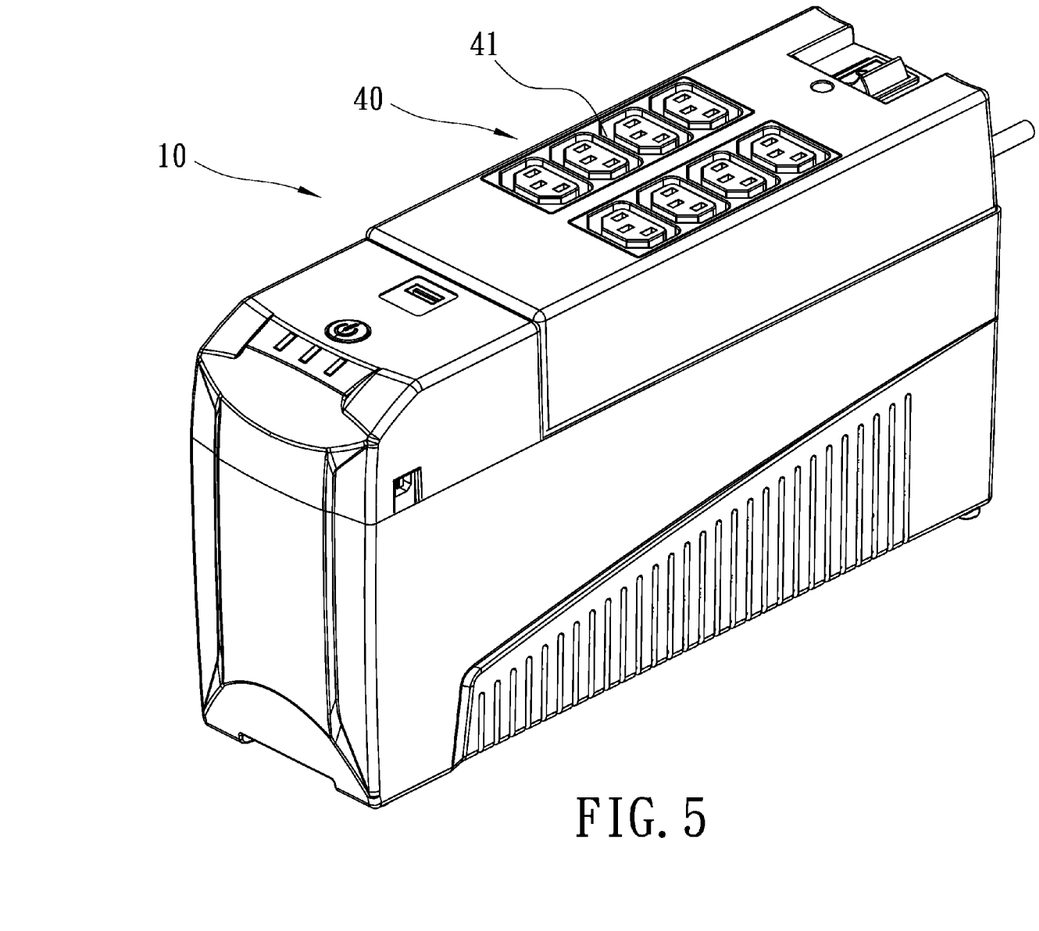
FIG. 5 is a perspective view of a modular structure of independent output/input socket for UPS according to another alternative mode of the above preferred embodiment of the present invention.
Figure 6:
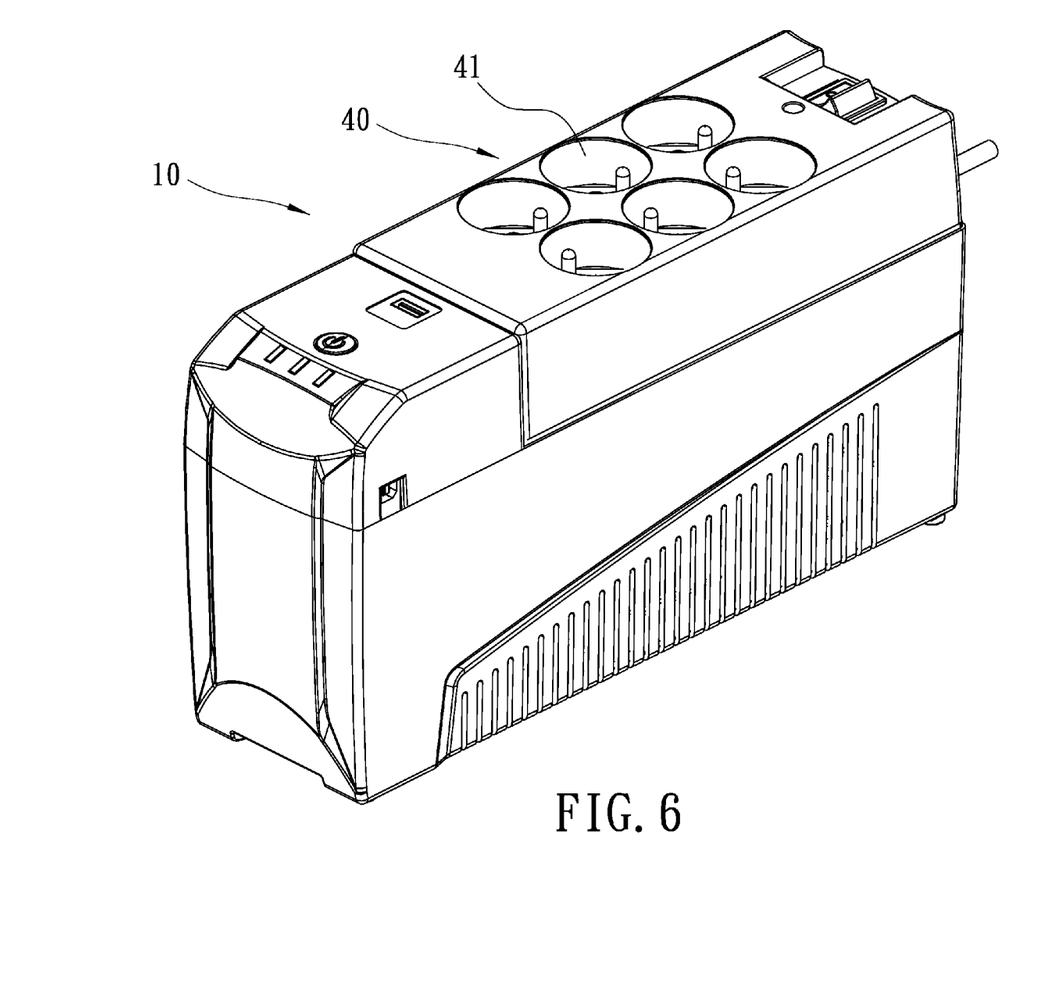
FIG. 6 is a perspective view of a modular structure of independent output/input socket for UPS according to another alternative mode of the above preferred embodiment of the present invention.
Figure 7:
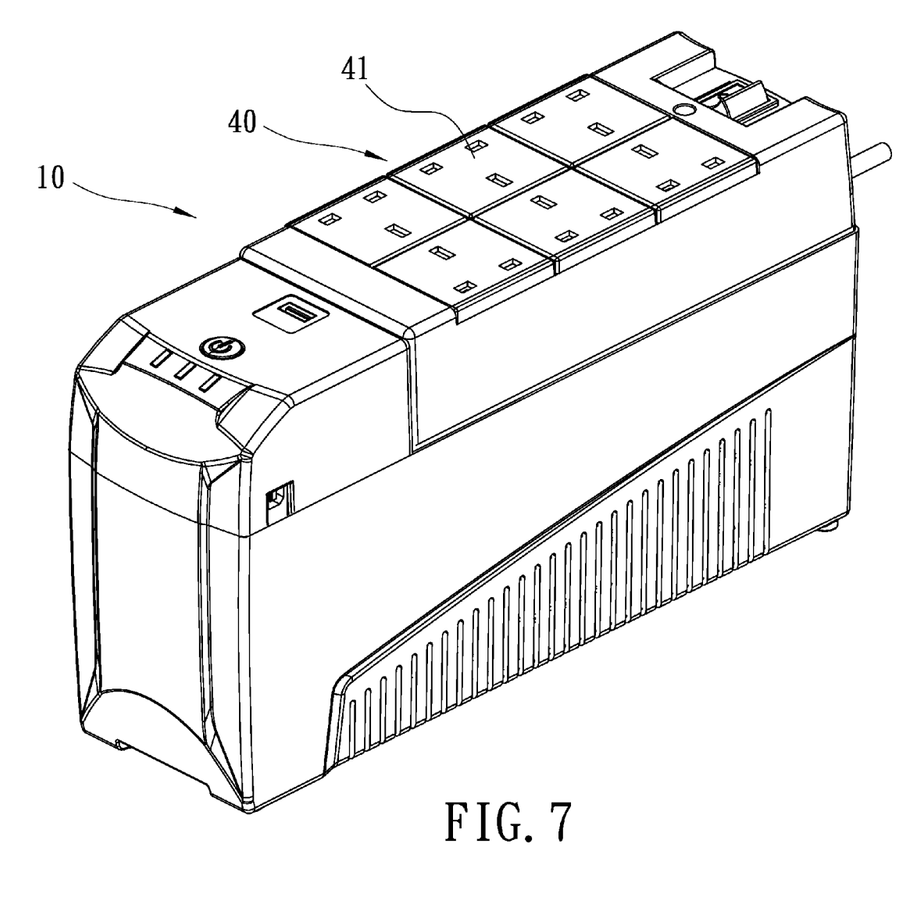
FIG. 7 is a perspective view of a modular structure of independent output/input socket for UPS according to another alternative mode of the above preferred embodiment of the present invention.
Figure 8:
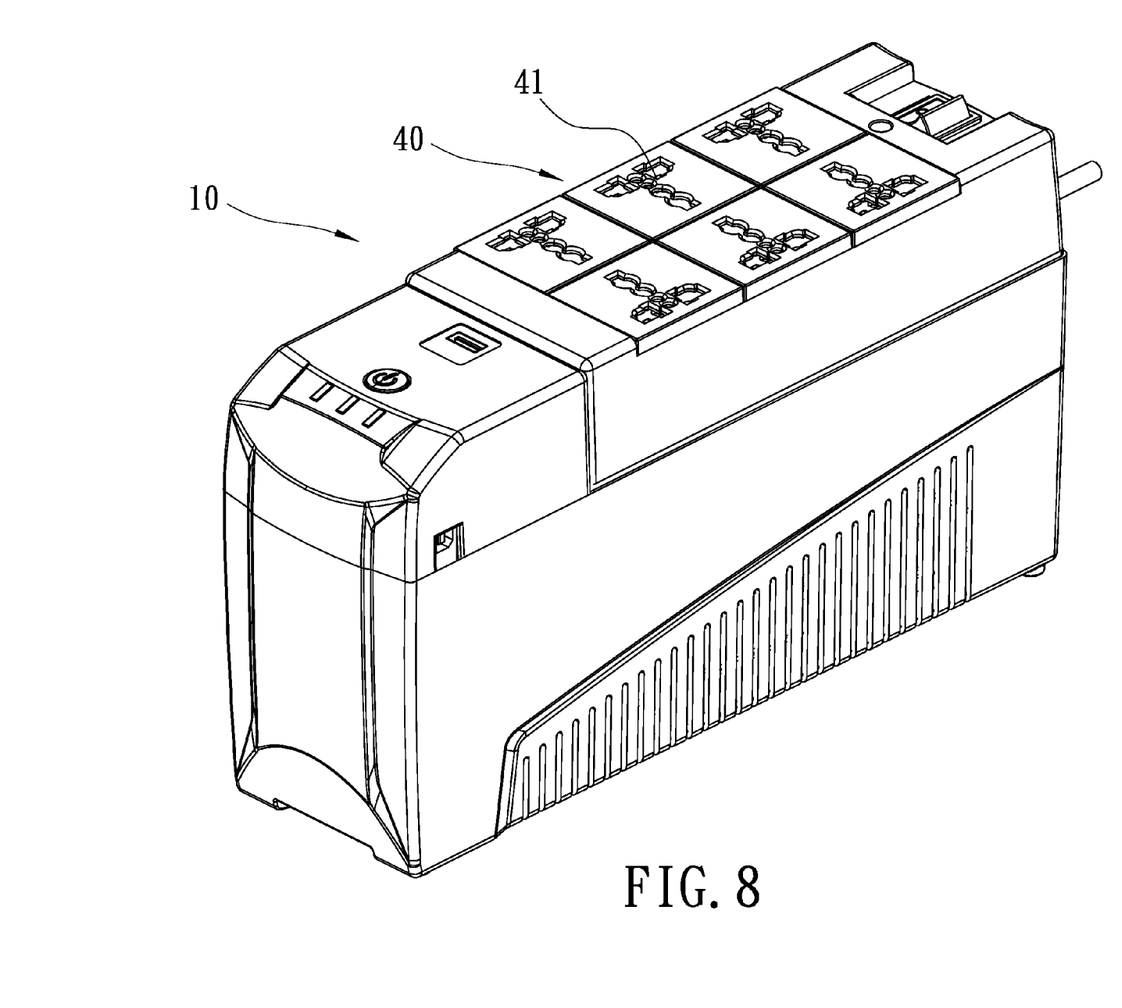
FIG. 8 is a perspective view of a modular structure of independent output/input socket for UPS according to another alternative mode of the above preferred embodiment of the present invention.
Figure 9:
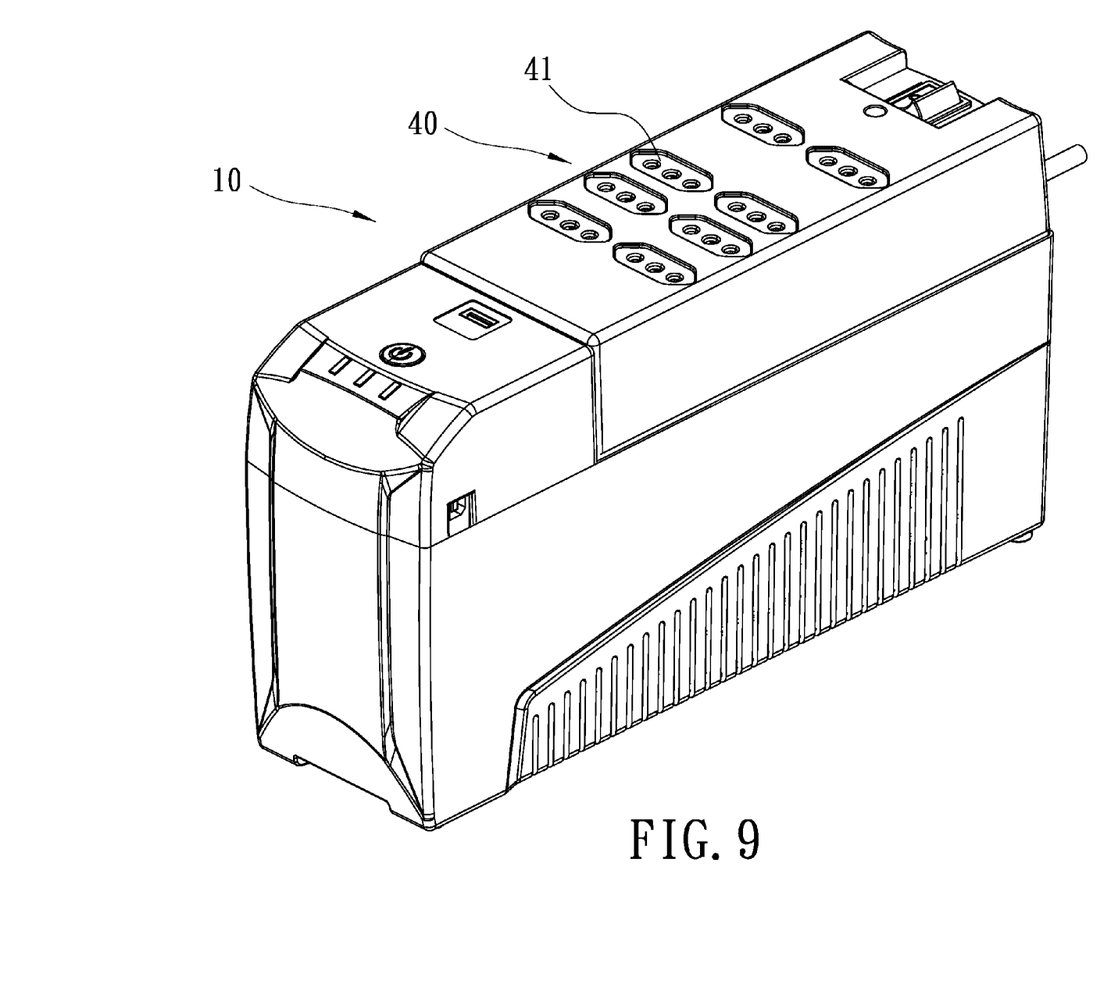
FIG. 9 is a perspective view of a modular structure of independent output/input socket for UPS according to another alternative mode of the above preferred embodiment of the present invention.
Figure 10:
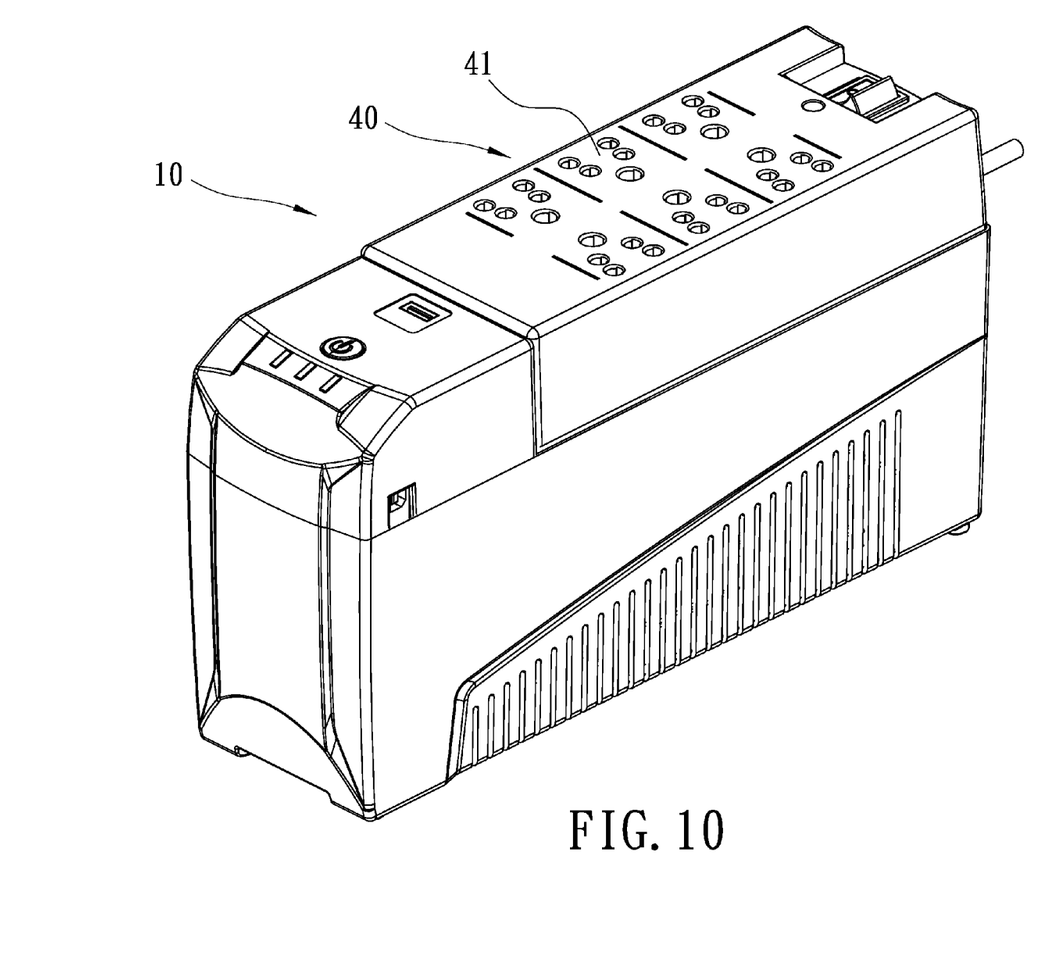
FIG. 10 is a perspective view of a modular structure of independent output/input socket for UPS according to another alternative mode of the above preferred embodiment of the present invention.
Figure 11:
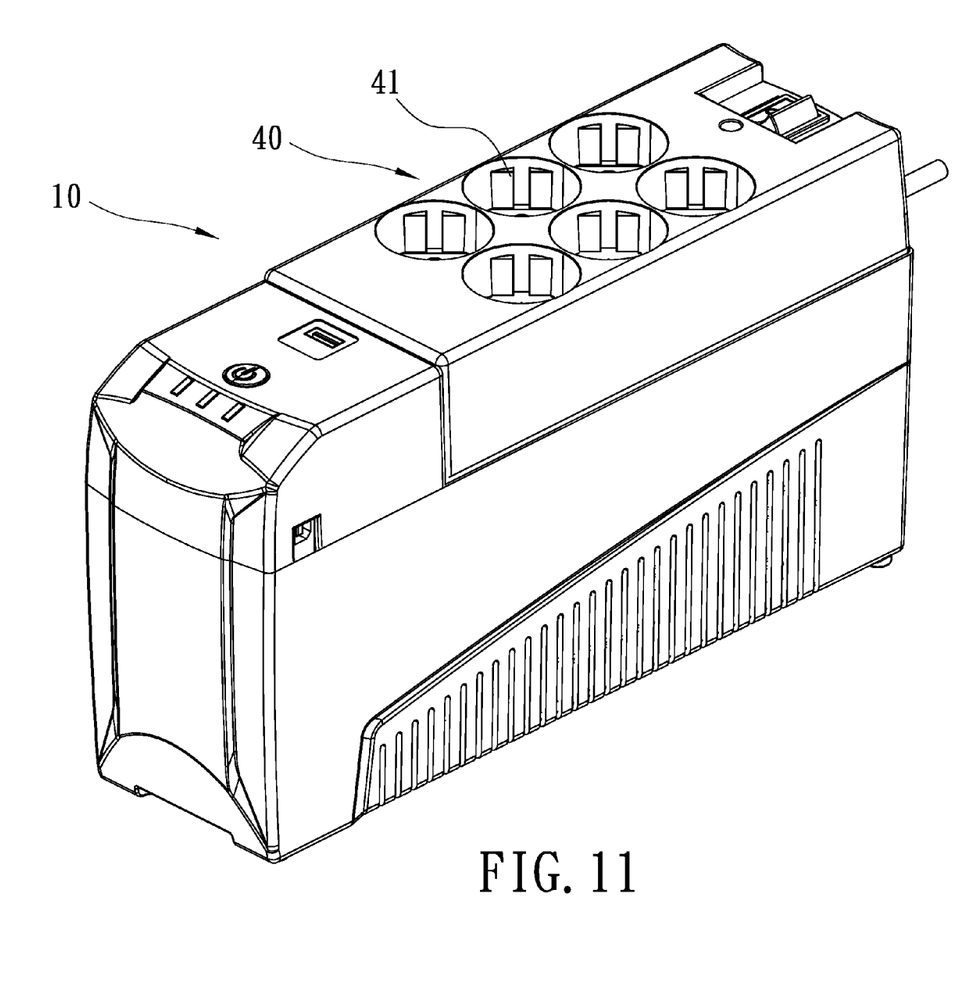
FIG. 11 is a perspective view of a modular structure of independent output/input socket for UPS according to another alternative mode of the above preferred embodiment of the present invention.

Referring to FIG. 1 to FIG. 3, a modular structure of independent output/input socket for UPS is illustrated according to preferred embodiment of the present invention. The UPS host 10 comprises a host body 20. The foreside of the host body 20 has a fastening hole 21. The host body 20 has a receiving cavity 22, and a plurality of tightening holes 23 at the edge thereof. A storage battery 24, a transformer 25 and a circuit board 26 are received in the receiving cavity 22. A socket supporter 30, a detachable socket 40, the storage battery 24, the transformer 25 and the circuit board 26 are connected with connection wire 27.

The socket supporter 30 is fixed on the upper portion of the host body 20. The top portion of the fore portion of the socket supporter 30 has a UPS switch 32. The bottom portion of fore portion of the socket supporter 30 has a barb 31, and the barb 31 is coupled with the fastening hole 21. The rear portion of the socket supporter 30 has an insertion space 33. A host power joint 34 is fixed on the fore portion of the insertion space 33. A restraining pole 35 is fixed on the rear portion of the insertion space 33. A plurality of securing holes 36 are fixed at the edge of the insertion space 33. The screw is secured on the tightening hole 23 of the host body 20 through the securing hole 36.

A detachable socket 40 is inserted in the insertion space 33, and the upper portion of the detachable socket 40 has a plurality of power output jacks 41. The rear portion of the power output jacks 41 has a bypass switch 42 and a power input wire 43. A protection cover 44, that is capable of being opened, is arranged to the top portion of the bypass switch 42. A socket bottom board 45 is arranged to the bottom portion of the detachable socket 40. The socket bottom board 45 has a perforation 46 in the fore portion and a restraining hole 47 in rear portion. A socket power joint is arranged on the perforation 46. The host power joint 34 is inserted in the socket power joint, and the restraining hole 47 is connected with the restraining pole 35.

Through the above components, when UPS host 10 needs to be repaired because it is damaged, just press the UPS switch 32, open the protection cover 44, and turn on the bypass switch 42. Input power will directly connect with the power output jacks 41 of the detachable socket 40 through the power input wire 43. The detachable socket can then be removed, and the UPS host sent for repair. In other words, the original load equipment plugs do not have to be unplugged one by one and then moved to the wall or other power socket. If there are not enough power sockets on the wall, then an additional extension wire socket having multi jacks must be utilized. The action of unplugging and plugging in load plugs into the different power sources can be tedious and even dangerous. After the socket supporter 30 is fastened on the UPS host, the detachable socket 40, which is inserted in the socket supporter 30, can be replaced with other detachable socket 40 having configurations of different power jacks from around the world.

Referring to FIG. 4 to FIG. 11, the detachable socket 40, having different power output jacks, is inserted in the UPS host is illustrated according to alternative mode of the above preferred embodiment of the present invention.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A modular uninterruptible power supply (UPS), comprising:
   a UPS host comprising a host body having a fastening hole in a foreside thereof, and a receiving cavity therein, said receiving cavity having:
      a plurality of tightening holes at an edge thereof,
      a storage battery received in the receiving cavity,
      a transformer received in the receiving cavity, and
   a circuit board received in the receiving cavity;
   a socket supporter fixed on an upper side of said host body, said socket supporter having:
      a UPS switch on a top portion of a fore portion thereof,
      a barb on a bottom portion of the fore portion thereof which is coupled with said fastening hole,
      an insertion space having a host power joint at a foreside thereof,
      a restraining pole at a rear portion thereof, and
      a plurality of securing holes on an edge thereof,
   wherein a screw is secured on each of the tightening holes through a respective one of the securing holes; and
   a detachable socket inserted into said insertion space, said detachable socket having:
      a plurality of power output jacks on an upper portion thereof,
      a bypass switch and a power input wire at a rear portion of said power output jacks,
      a socket bottom board on a bottom of said detachable socket, said socket bottom board has:
         a perforation at a fore portion thereof, said perforation has a socket power joint thereon, said host power joint inserts in said socket power joint, and a restraining hole at a rear portion thereof, said restraining hole is coupled with said restraining pole.

2. The modular UPS, as recited in claim 1, wherein said socket supporter, said detachable socket, said storage battery, said transformer and said circuit board are connected by a connection wire.

3. The modular UPS, as recited in claim 1, wherein said bypass switch has a protection cover which is capable of being opened.

4. The modular UPS, as recited in claim 1, wherein after said host power joint inserts in said socket power joint, said restraining hole is coupled with said restraining pole.

5. The modular UPS, as recited in claim 1, wherein a second one of said detachable socket is capable of replacing a first one of said detachable socket, the second one of said detachable socket having a different configuration of said power output jacks than the first one of said detachable socket.

6. The modular UPS, as recited in claim 1, wherein after said UPS switch is pressed, said bypass switch is turned on, so that input power is connected with said power output jacks of said detachable socket from said power input wire.

7. The modular UPS, as recited in claim 1, wherein after power is directly connected with said power output jacks of said detachable socket from said power input wire, said detachable socket is removed, so that said UPS host is sent to repair.

\* \* \* \* \*